(12) United States Patent
Scuderi

(10) Patent No.: US 12,296,922 B2
(45) Date of Patent: May 13, 2025

(54) ACTUATION SYSTEM FOR A PEDAL-ACTUATED ELECTRIC VEHICLE

(71) Applicant: NOVA PROGETTI S.R.L., Turin (IT)

(72) Inventor: Gualtiero Scuderi, Grugliasco (IT)

(73) Assignee: NOVA PROGETTI S.R.L., Turin (IT)

( * ) Notice: Subject to any disclaimer, the term of this patent is extended or adjusted under 35 U.S.C. 154(b) by 0 days.

(21) Appl. No.: 18/378,337

(22) Filed: Oct. 10, 2023

(65) Prior Publication Data

US 2024/0116598 A1 Apr. 11, 2024

(30) Foreign Application Priority Data

Oct. 10, 2022 (IT) .......................... 102022000020814

(51) Int. Cl.
*B62M 6/55* (2010.01)
*B62M 6/45* (2010.01)

(52) U.S. Cl.
CPC ................ *B62M 6/55* (2013.01); *B62M 6/45* (2013.01)

(58) Field of Classification Search
CPC ........ B62M 6/55; B62M 6/45; B62M 11/145; B62M 9/06; B62M 6/40–6/75; F16H 37/022
USPC .......................................................... 475/210
See application file for complete search history.

(56) References Cited

U.S. PATENT DOCUMENTS

| | | | |
|---|---|---|---|
| 5,121,936 A | 6/1992 | Cowan | |
| 6,672,418 B1 * | 1/2004 | Makino | B62M 6/65 180/206.3 |
| 6,689,000 B1 * | 2/2004 | Kapaan | F16H 63/062 475/210 |
| 8,550,199 B2 * | 10/2013 | Moeller | B62M 6/45 180/206.7 |
| 9,796,449 B2 * | 10/2017 | Dommsch | B62M 6/70 |
| 10,981,623 B2 * | 4/2021 | Tsuchizawa | B62M 6/50 |
| 2016/0052595 A1 | 2/2016 | Dommsch | |
| 2018/0370595 A1 | 12/2018 | Faneco | |

FOREIGN PATENT DOCUMENTS

| | | | |
|---|---|---|---|
| DE | 102014223335 A1 | 5/2016 | |
| DE | 102018118167 A1 * | 1/2019 | F16D 48/02 |
| FR | 2926530 A1 | 7/2009 | |

OTHER PUBLICATIONS

Italian Patent Application No. 202200020814, Search Report, dated Apr. 6, 2023.

* cited by examiner

*Primary Examiner* — Sherry L Estremsky
(74) *Attorney, Agent, or Firm* — Troutman Pepper Locke LLP

(57) ABSTRACT

An actuation and traction system for a pedal-actuated electric vehicle like electric bicycle, electric tricycle, or electric quadricycle comprises an electric motor, a transmission comprising an epicyclic device and a variable speed drive actuated independently of the pedals wherein the variable speed drive comprises an actuator that discretizes the ratio, and two expandable pulleys wherein the transmission of the motion occurs through a cascade of gears adapted to obtain the desired transformation ratio between the electric motor that rotates at high speed, and the pinion that actuates the chain for transmitting motion to the wheel of the electric vehicle.

14 Claims, 17 Drawing Sheets

|    | 22   | 32   | 44   |
|----|------|------|------|
| 11 | 4,06 | 5,91 | 8,12 |
| 12 | 3,72 | 5,41 | 7,44 |
| 14 | 3,19 | 4,64 | 6,38 |
| 16 | 2,79 | 4,06 | 5,58 |
| 18 | 2,48 | 3,61 | 4,96 |
| 21 | 2,13 | 3,09 | 4,25 |
| 24 | 1,86 | 2,71 | 3,72 |
| 28 | 1,60 | 2,32 | 3,19 |
| 32 | 1,40 | 2,03 | 2,79 |

*FIG. 17*

ACTUATION SYSTEM FOR A PEDAL-ACTUATED ELECTRIC VEHICLE

CROSS-REFERENCE TO RELATED APPLICATION

This application claims priority to Italian Patent Application No. 102022000020814, filed on Oct. 10, 2022, which is hereby incorporated by reference in its entirety.

TECHNICAL FIELD OF THE INVENTION

The present invention relates to an actuation system for a pedal-actuated electric vehicle. In particular, the present invention relates to the field of pedal-assisted bicycles or e-bikes.

More in detail, a particularly advantageous application of the present invention is in the field of pedal-assisted bicycles provided with an electric motor that can be operated to "assist" the user's pedaling when needed. The present invention can also be used in pedal-actuated electric tricycles or quadricycles.

In detail, the present invention relates to a solution for an actuation system for a pedal-actuated electric vehicle of the type in which the motor acts on the pedal axis and in which the chain actuated by the movement of the pedals or the motor acts on the rear wheel through pinions.

In even greater detail, the present invention relates to a continuously variable pedal-assisted bicycle that also allows energy recovery during braking.

Therefore, the present invention relates to an actuation and traction system, and a pedal-assisted bicycle tricycle or quadricycle provided with the actuation and traction system.

BACKGROUND ART

E-bikes are pedal-assisted bicycles, provided with an electric motor that can be operated to "assist" the user's pedaling when needed. This means that these bikes are in all respects comparable to conventional bicycles when the motor is not active. Conversely, when the user chooses to turn on the electric motor for help or assistance in pedaling, the bike becomes electric and requires less muscle effort to move.

The Highway Code also recognizes the difference between traditional bicycles and e-bikes but considers them to be comparable as neither exceeds 25 km/h; therefore, pedal-assisted bicycles do not require registration, license plates, or insurance.

On pedal-assisted electric bikes, the electric motor is automatically activated after the first few pedal strokes and it gains speed with minimal effort.

The electric motor operates based on signals sent by a sensor that detects the movement of the pedals. As the rotation of the pedals increases, the signals sent by the sensor become more frequent, and consequently, the motor can progressively reach maximum speed. Being assisted, pedaling then becomes increasingly smooth and easy. According to the regulations governing these kinds of vehicles, the motor is turned off when the maximum speed of 25 kilometers per hour is reached, or when pedaling is stopped.

Two types of sensors are currently available on the market, i.e., a motion sensor that can be activated at the first rotation of the pedals, and a torque sensor, with a device that is sensitive to the force applied onto the pedals by the cyclist. In this case, the motor contribution is actually adjusted by the thrust that the cyclists apply on the bike with their legs.

The motor of the electric bicycle is powered by a rechargeable battery.

The same applies to pedal-actuated electric vehicles, such as tricycles or quadricycles.

If we disregard the tricycle equipped with an electric motor designed by Gustave Trouvé as a demonstration in Paris in 1881, the electric bicycle is believed to have officially originated in 1895 with the filing of patent application U.S. Pat. No. 552,271A, by American Ogden Bolton Jr. This solution involved the use of a motor placed in the hub of the rear wheel.

Today, the pedal-assisted electric bicycle is defined as a hybrid vehicle that combines muscle power with that of an electric motor.

The thrust of the electric motor only intervenes at the same time as the user's muscular pedaling and is intended to require less and even effort in the user's pedaling, supporting the user, for example, when climbing uphill or on uneven or bumpy terrain.

The implementing technique of e-bikes currently involves two types of solutions:
in the first type, the motor is arranged directly in the hub of the front or rear wheel, while in the second type, the motor acts directly on the pedal axis, at the bottom bracket where the pinion which engages the drive chain is located. The drive chain driven by the user's movement of the pedals acts on the rear wheel through the pinions.

The major difference between the two types of systems is the characteristics of the driving torque that the motor transfers to the wheel.

In the case of the first type of solution, i.e., with a motor in the hub of the front or rear wheel, the torque is exactly the one delivered by the motor. It is thus not adaptable to different conditions of use in which greater or lesser intensities of pedaling assistance are required.

In the second type of solution, i.e., with a central motor positioned on the pedal axis, since the reductions of the different gearbox pinions can be used, the torque transmitted to the ground is variable depending on the chosen gear ratio and the conditions of use, i.e., starting, climbing, high speed or low speed.

Furthermore, the presence of the gearbox placed on the hub of the driving wheel has standardized the presence of a free wheel in the hub as a decoupling element, so that the pedals are not always in motion even when traction energy is not required (downhill or braking).

In this case, i.e., in the second type of solution, it is apparent that the motor located on the pedal axis is stationary under the aforesaid conditions of use and also when braking or downhill, and therefore energy recovery is not possible.

In current solutions on the market, the motor is powered by a lithium-ion battery, usually housed so that it can be easily removed for charging.

Furthermore, the electric bike is provided with an electrical system consisting of, in addition to the electric motor and a battery, cadence sensors, effort sensors, speed sensors, cut-off sensors, and generally a display to control operation.

In the solutions of the known type, the critical element of the whole bicycle is the gearbox.

The presence of the gearbox makes it possible to shift the gear ratio between the pinion present on the pedal axis and the pinion present on the drive wheel axis. This change in the gear ratio is necessary to adjust the muscular effort applied to the gear and is variable according to different conditions of use within the limits allowed by the user's ability.

The gearbox consists of a set of pinions placed on the axis of the driving wheel and one or more crown wheels placed on the axis of the pedals. A drive chain transmits the force applied on the pedals from the pinion to the selected pinion by a mechanism called a derailleur that makes the chain slide from one pinion to the other. This can only happen with the chain in motion and thus during the motion of the bicycle.

Furthermore, during the transition from one pinion to another, the transmission of force through the chain must be interrupted.

This type of operation results in several drawbacks.

Users may quite often find themselves in situations in which it is important to maintain perfect control of the vehicle, e.g., in the presence of obstacles, bends, changes of slope or bumpy roads, or suboptimal road surface or ground conditions, while simultaneously needing more or less tractive force that would require a shifting gear.

However, interrupting the force transmission during shifting could lead to erratic behavior of the bike resulting in skidding or danger of the user losing control of the bike.

Therefore, in this case, the user normally prefers to keep the unsuitable gear ratio rather than risk shifting and encountering a problem. This has as possible consequences either too much effort on the part of the user with excessive energy consumption by the motor or uncomfortable pedal operation for the user.

Should the vehicle need to stop, the gearbox would be set to the gear ratio it had before stopping in this type of known solution because it is only possible to shift the gear ratio when the chain-pinion system is in motion when starting again. However, the gear ratio is usually not the most suitable for starting. As a consequence of this limitation, i.e., not being able to shift gears with the bike stationary, at the start there would be suboptimal effort by the user with excessive energy consumption by the motor.

SUMMARY OF THE INVENTION

It is thus the main purpose of the present invention to overcome or at least minimize the drawbacks outlined above and found in the prior art.

In particular, from this feature analysis, it is the first object of the present invention to improve some operating, performance, and efficiency characteristics typical of current e-bikes or pedal-actuated electric vehicles, such as tricycles or quadricycles.

In the following description, reference will be made to an electric bicycle or e-bike, but this solution can also be applied to electric tricycles or pedal-actuated electric quadricycles referred to in the following as "electric vehicles" for the sake of brevity.

Therefore, the characteristic points of the suggested solution are listed below:
  continuous rather than discrete variation,
  automatic positioning on the gear ratio most convenient to the user, such as upon starting or downhill, and
  energy recovery under braking.

From the technical architecture chosen to solve the identified critical elements, other possible factors for functional improvement also emerge, such as operating the electric motor at high RPM to achieve better performance and multiplying pedaling for rapid response.

It is a further object of the present invention to make available a solution that allows the system to be installed, on existing frames without having to resort to modification of shapes and geometries (interchangeability). Thus, in particular, a modification kit is provided for e-bikes or existing pedal-actuated electric vehicles, such as tricycles or quadricycles.

Furthermore, the use of the internal gearbox/pedals does not expose the system to shocks or dirt (mud, water, leaves, dust), leaving the user free to ride on potentially dangerous terrain by not having an external derailleur pinion system.

The presence of a direct final ratio without a derailleur offers the possibility of using either a traditional chain or a maintenance-free (lubrication-free) toothed belt.

Finally, according to the present invention, the actuation system must be characterized by manufacturing costs compatible with market needs, small size, and dimensions, and be applicable to e-bikes and electric vehicles, such as tricycles or quadricycles of known types, in manners that are equally simple and cost-effective, as well as without requiring substantial modifications to the structure.

In particular, the solution described here concerns an actuation and traction system for a pedal-actuated electric vehicle comprising an electric motor, a transmission comprising an epicyclic device, a variable speed drive actuated autonomously with respect to the pedals, in which the variable speed drive comprises an actuator that discretizes the gear ratio, and two expandable pulleys.

The actuation and traction system further comprises an integrated board provided with devices for actuating the control software with sensor management, wherein said integrated board is adapted to control said electric motor based on the signals received from the sensors.

The actuation and traction system further comprises a pinion for transmitting the motion from the pedals or electric motor to the wheel of the pedal-actuated electric vehicle. The pinion and the variable speed drive are positioned coaxially on the pedal axis and the motion transmission occurs between the pedals and the wheel of the pedal-actuated electric vehicle through the kinematic chain that comprises the epicyclic device and the variable speed drive.

The transmission of the motion between the electric motor and the pinion occurs through a cascade of gears adapted to obtain the desired transformation ratio between the electric motor that rotates at high speed, and the pinion that actuates the motion transmission chain to the wheel of the electric vehicle.

The system further comprises a casing for containing the electric motor, the transmission, and the variable speed drive. Finally, the pinion gear is placed on the outside of the casing.

The present invention is based on the general consideration that it is possible to achieve the purposes above and, in particular to meet the functional and reliability requirements, by means of a solution involving motion transmission through a kinematic chain comprising an epicyclic reducer, two expandable pulleys, and a continuously variable reducer.

This solution applies to electric bikes and to pedal-actuated electric vehicles such as tricycles or quadricycles.

BRIEF DESCRIPTION OF THE FIGURES

Hereafter, the present invention will be further explained by means of the following detailed description of the possible embodiments shown on the drawings, in which corresponding or equivalent features and/or component parts of the present invention are identified by the same reference numbers. It must be noted that the present invention is not limited to the embodiments described below and shown in the accompanying drawings; on the contrary, all the variants and/or changes to the embodiments described below and shown on the accompanying drawings which will appear obvious and immediate to a person skilled in the art are comprised within the scope of the present invention.

Embodiments of the system disclosed herein are shown in the drawing tables, shown by way of non-limiting example:

FIG. 17 is an exemplary table of different ratios that can be obtained with three pinions and the nine pinions.

DETAILED DESCRIPTION OF THE PRESENT INVENTION

Figure 1:
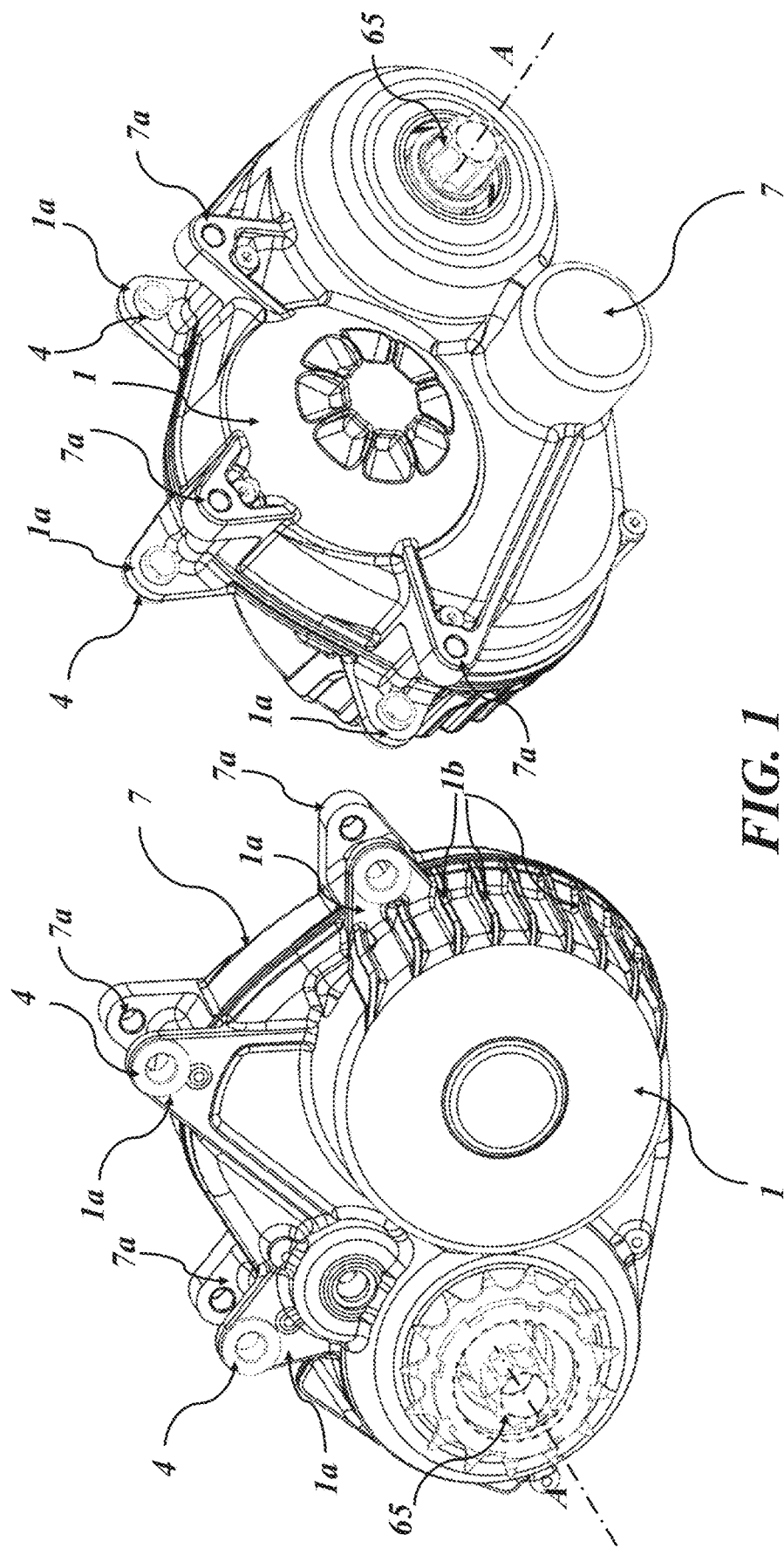
FIG. 1 shows two perspective views of an actuation system for a pedal-actuated electric vehicle according to the present invention.

The present invention is applied, in particular, in the field of electric bicycles or e-bikes. Further applications are in the field of pedal-actuated electric vehicles, such as tricycles or quadricycles.

The solution suggested here was created for application on e-bikes, but it can be transposed to other fields, such as that of pedal-actuated electric vehicles, i.e., tricycles or quadricycles.

Some points of intervention for the improvement of operating characteristics, performance, and efficiency emerge from the analysis of the peculiarities of current e-bikes.

First, after careful analysis and focused studies, it was concluded that it is appropriate to opt for continuous rather than discrete variation.

Furthermore, it is preferable to be able to have automatic positioning on the most convenient gear ratio, e.g., when starting or under special conditions while using the vehicle.

And finally, it would be advantageous to be able to have braking energy recovery as well.

These are the three main objectives that the solution suggested here aims to achieve, in particular.

Other possible factors for functional improvement also emerge from the technical architecture chosen to solve the identified critical elements.

In particular, action can be taken on the operation of the electric motor at high rpm to achieve better efficiency and on the pedaling multiplication ratio to achieve rapid response.

The operating principle of the actuation system for a pedal-actuated electric vehicle according to the present invention will now be described.

The need is felt to achieve continuous rather than discrete variation has as a natural consequence that of using a variable speed drive instead of a gearbox provided with a series of discrete ratios.

With a variable speed drive actuated independently of pedaling, it is also possible to achieve automatic positioning on the most convenient gear ratio for starting. This solves the problem at starting and avoids having suboptimal effort by the user and/or excessive power consumption by the electric motor.

Regarding energy recovery under braking, it is necessary to have a device that decouples the motor and wheels from the pedals, i.e., to separate the connection of the motor and wheels from the pedals in the coasting steps. This makes it possible to have the pedals stopped when the vehicle is moving forward without requiring the use of muscle work to operate the e-bike or pedal-actuated electric vehicle (e.g., when going downhill or slowing down).

The aforesaid conditions define the architecture and the operating principles of the actuation system for a pedal-actuated electric vehicle according to the present invention and, in particular:

the use of an automatically actuated variable speed drive, and the pedal system disconnected or decoupled from the motor-wheel system under the conditions in which energy recovery is possible.

In addition to these inherent technical elements that condition the operation of the system, there are also particularities of the application which allow for a solution with maximum weight containment and transverse dimensions determined by the usual positioning of the pedals. In particular, there are constraints on the maximum width of the pedal axis to ensure comfortable pedaling and correct leg position while pedaling. In this manner you will have few modifications to make and can use standard structures and frames.

The steps that led to the solution suggested here will now be described, with details of the development of the project.

An initial activity consisted of evaluating the possible alternatives and, within each of them, analyzing potential problems to be solved or elements to be explored further.

Literature research on the design and use of variable speed drives led to the decision to implement a multiplication of the pedal revolutions because the relative movement of the variable speed drive pulley discs occurs faster the higher the speed of their rotation. A further advantage of the increased rotational speed is the reduction in the instantaneous torque value transmitted by the variable speed drive. This increase in rotational speed was achieved with the use of an epicyclic device that works as a multiplier. The control of the position of the variable speed drive pulleys is achieved with an actuator consisting of a small electric motor operating through a gear reduction.

The analysis continued with the search for an appropriate point of connection of the electric motor to the variable speed drive kinematics for the purpose of being able to operate at high rpm.

The technical solution of high-speed operation allowed a reduction in the size of both the variable speed drive and the motor, the latter being able to operate under the best efficiency conditions. This made it possible to reduce the dimensions and weight of the system as a whole.

A further element of analysis and development was the disconnecting system of the pedal from the wheel-variable speed drive-motor assembly under conditions in which muscle power is not needed for traction and vehicle deceleration energy can be recovered. In particular, a device was introduced to decouple the pedal box from the wheel-variable speed drive-motor assembly. In detail, such a decoupling device is a free wheel positioned to decouple the pedal from the wheel-variable speed drive-motor assembly.

In the solution implemented and suggested here, the bicycle wheel drives the motor through the final transmission resulting in possible energy recovery. The pedal is held stationary by the use of a free wheel mechanism that disconnects the motor from the transmission system connected to the pedal.

The choice of the motor was based on the torque/rpm characteristics and also on the evaluation of size consistent with the application to be able to meet the weight and dimensions requirements for the particular application for which it is intended.

In order to make the device self-sufficient and thus minimize electrical connections with the vehicle, the electronic boards with the variable speed drive actuation and motor control SW and related sensor technology were planned to be installed inside. Furthermore, the containment casing was also sized and designed in accordance with the heat dissipation capacity generated during operation.

After an approximate sizing of the various components that allowed the definition of the overall architecture of the unit, the final verification and related calculations, simulations, and strength and noise verifications were continued, moving on to the final design and drawing.

In particular, the present invention required the study and design of an epicyclic reducer, a variable speed drive with an actuator to adapt it to a traction motor that can be used on an e-bike or pedal-actuated electric vehicle. In detail, the motor/pinion connection was also studied and designed for decoupled operation by means of a free wheel. In addition, a casing for heat dissipation was also studied and designed.

Finally, the implementation of control software integrated with sensor management was developed.

The whole system studied and developed according to the suggested objectives will now be described.

The solution suggested here relates to a gearbox for a pedal-assisted bicycle or pedal-actuated electric vehicle. In particular, the gearbox comprises a continuously variable reducer, positioned on the pedal axis and contained within a housing (the reducer would otherwise be exposed to shocks).

In more detail, the solution involves the use of a reducer provided with expandable pulleys in which the reducer is positioned on the pedal axis and in which there is an actuator that discretizes the gear ratio. Finally, the system according to the present invention allows energy recovery during braking by means of a decoupling device, e.g., such as a free wheel.

FIG. 1 shows two perspective views of the actuation system for a pedal-actuated electric vehicle in the mounted condition. The actuation system for a pedal-actuated electric vehicle comprises a motor and a gearbox.

A right-hand actuation cover or housing for a pedal-actuated electric vehicle is shown in the drawings with reference numeral 1, while a left-hand actuation cover or housing for a pedal-actuated electric vehicle is shown in the figures with reference numeral 7. The union of the two housings, right 1 and left 7, gives the protective casing for housing the motor and gearbox for the pedal-actuated electric vehicle. The casing has a structure designed to contain the actuation system.

Reference numerals 1a and 7a show the attachment points for attaching the casing to the bicycle frame, as well as joining the two housing shells together to create the structural casing. Of course, the casing also has a protective function for the actuation system. On the side of the left cover 1, reference numeral 2 shows a stop ring, and reference numeral 3 a ball bearing, and symmetrically on the right cover side 7 there is a stop ring 8 and a ball bearing 9. These elements are used to support the pedal axis and allow the rotation of the pedals during muscle or electric motor operation.

Figure 2:
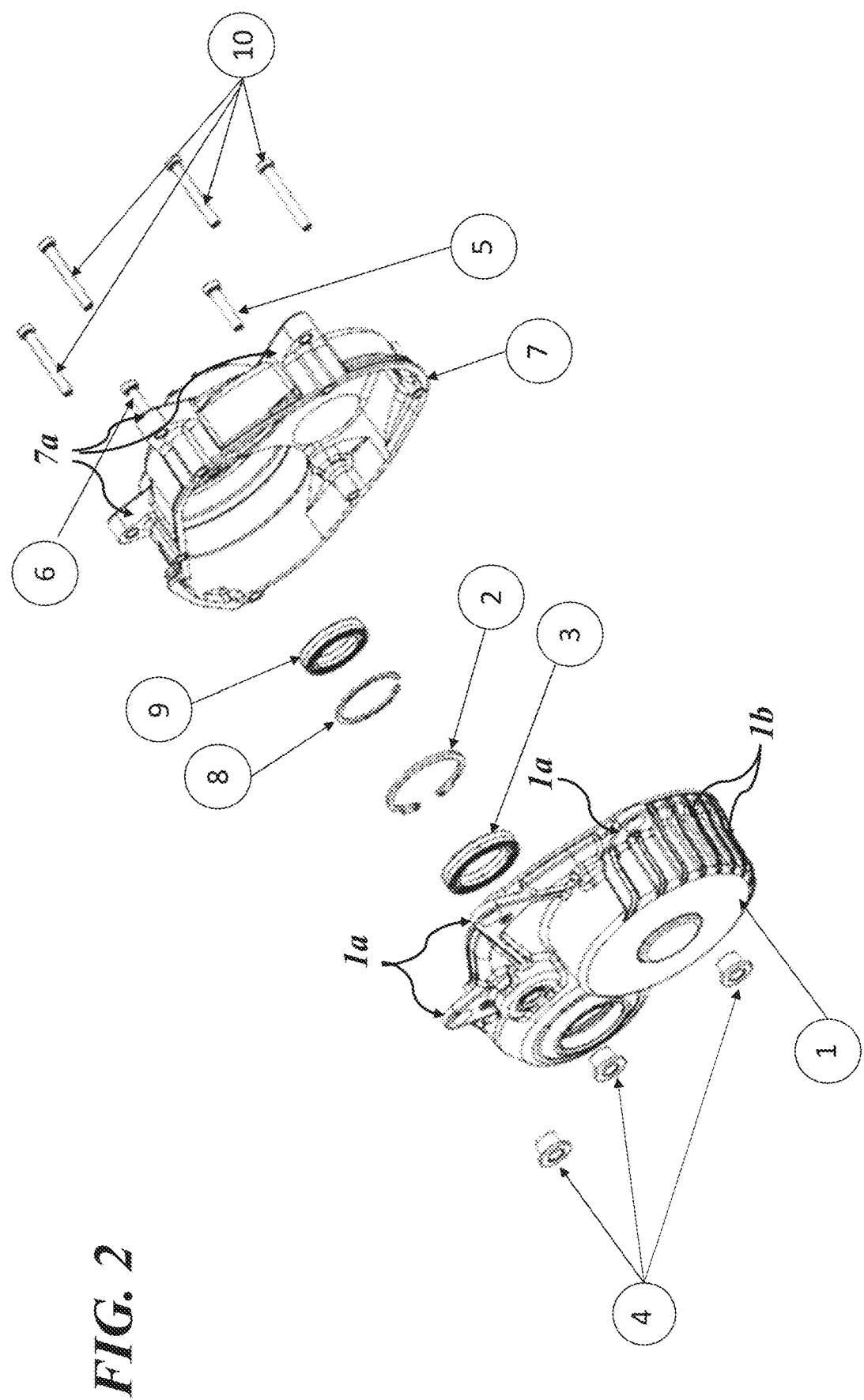
FIG. 2 shows a partially exploded view of the protection casing according to the present invention.

With reference to FIG. 2 that shows a partially exploded view, a number of fasteners is also visible that makes it possible to join together and secure the two covers, right 1 and left 7. The fasteners comprise, in particular, fixing bushings 4 and fixing screws, indicated by reference numerals 5, 6, 10.

FIG. 1 also shows the pedal axis A.

Finally, reference numeral 1b indicates cooling fins arranged on the right cover 1 to better dissipate the heat generated by the actuation system for a pedal-actuated electric vehicle.

Therefore, all the elements of the pedal-actuated electric vehicle actuation system are housed inside the two covers, right 1 and left 7.

Figure 3:
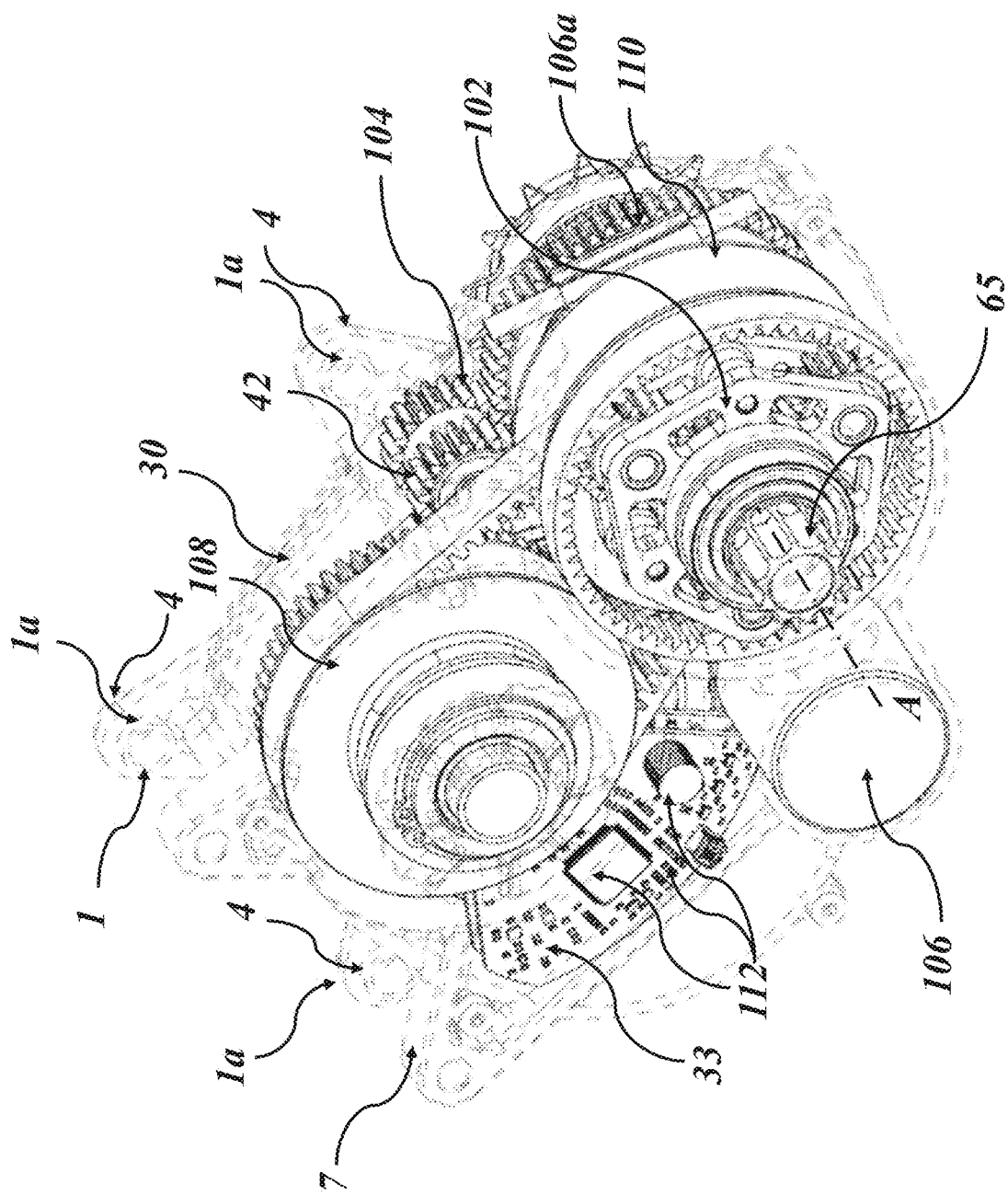
FIGS. 3 and 4 show assembled views of the actuation system for the pedal-actuated electric vehicle in FIG. 1, FIGS. 5-11 show exploded and partially assembled views of parts of the actuation system for the pedal-actuated electric vehicle in FIG. 1.
Figure 4:
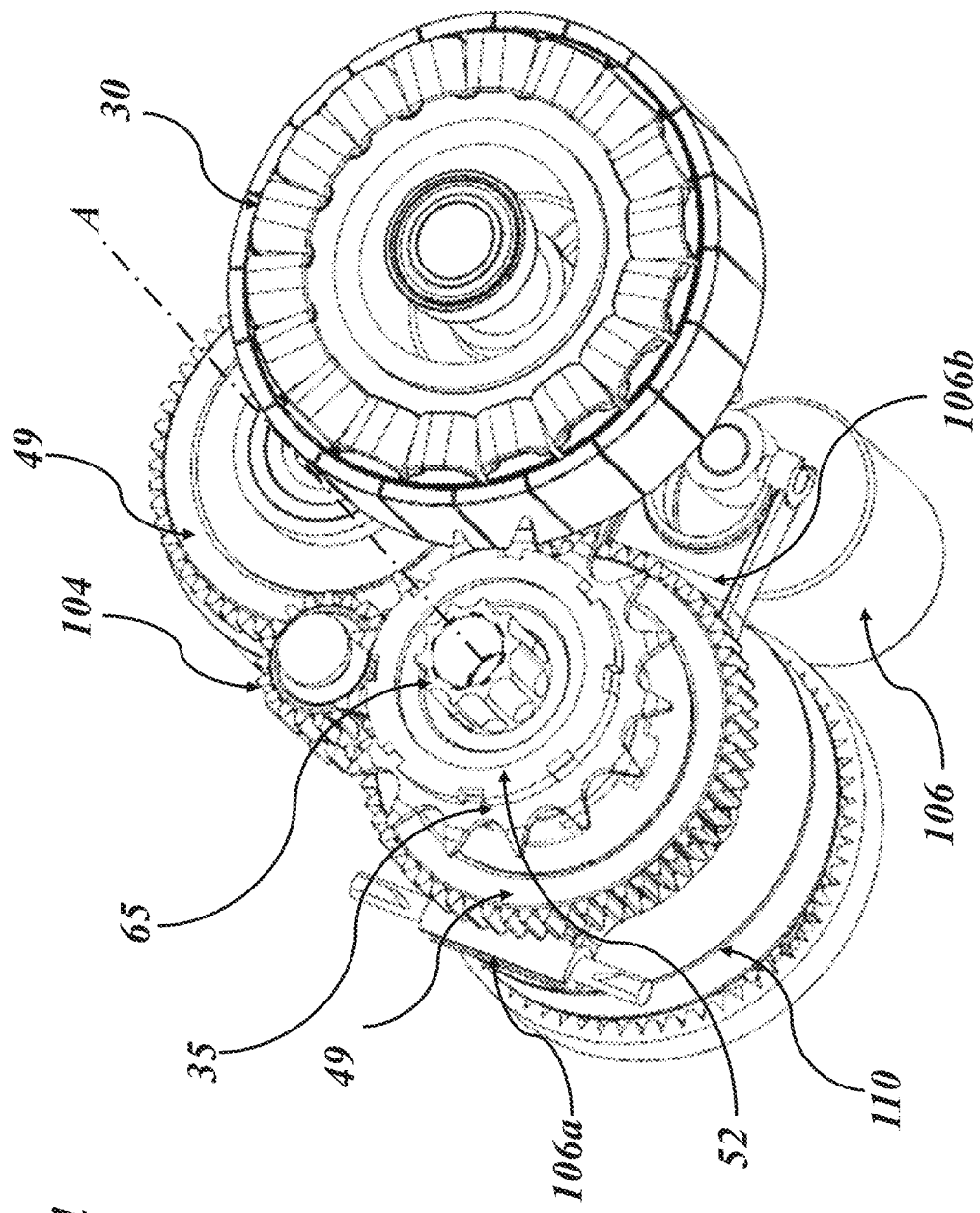
Figure 5:
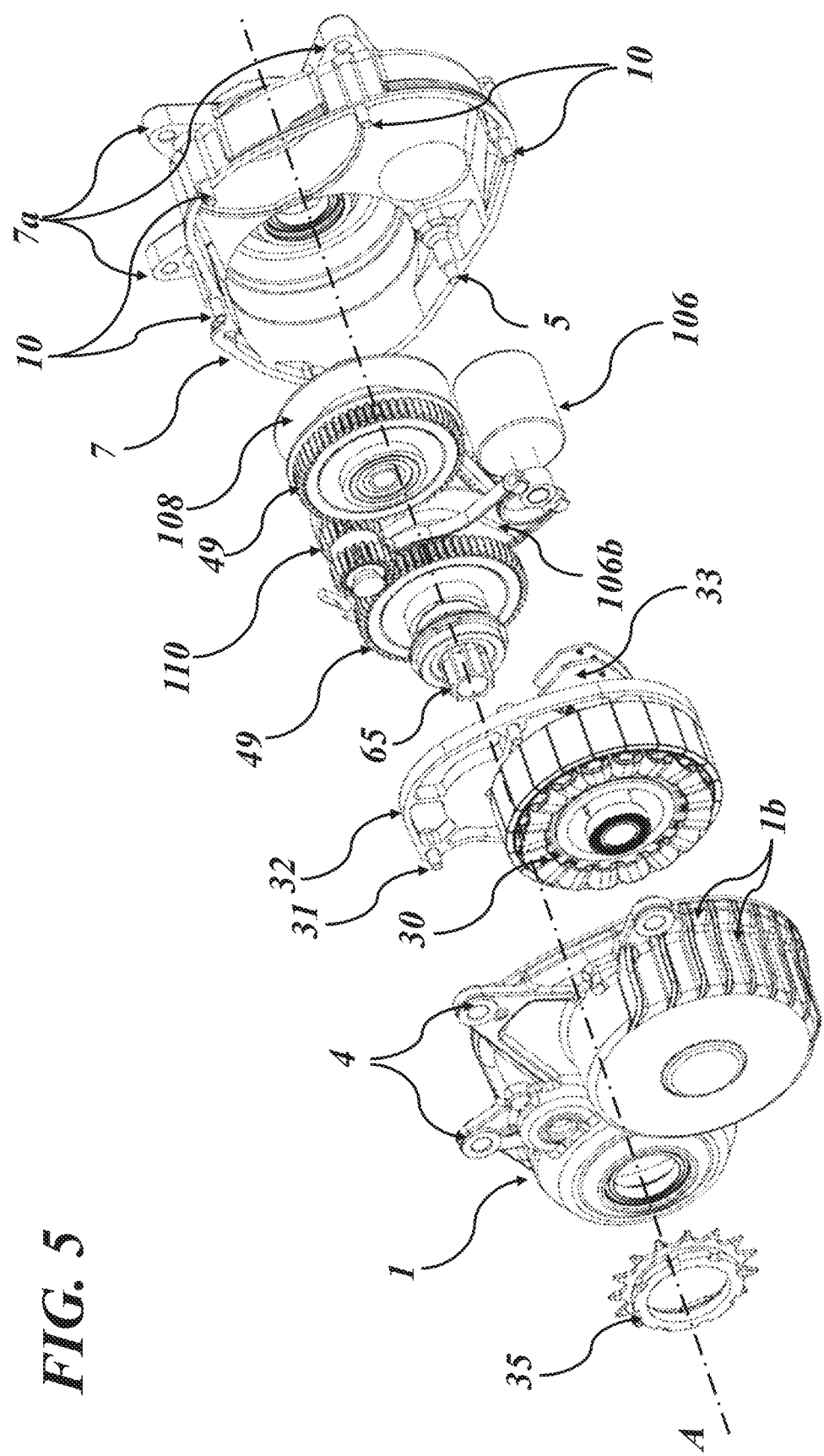

In particular, with reference to FIGS. 3 and 4, we have an electric motor or motor 30, a transmission comprising an epicyclic reducer 102, a variable speed drive 104 with an actuator 106, and two expandable pulleys 108 and 110. The pedal-actuated electric vehicle actuation system further comprises a support 33 for an integrated board 112 provided with devices for actuating the control software with sensor management.

The epicyclic device can be seen as a reducer or a multiplier depending on the gear ratio it introduces between the input and output speeds.

In particular, by the effect of the epicyclic reducer and variable speed drive, the device can provide the starting torque which makes it possible to help the user overcome the initial take-off, it can maintain a stable gear ratio in a flat course.

Figure 6:
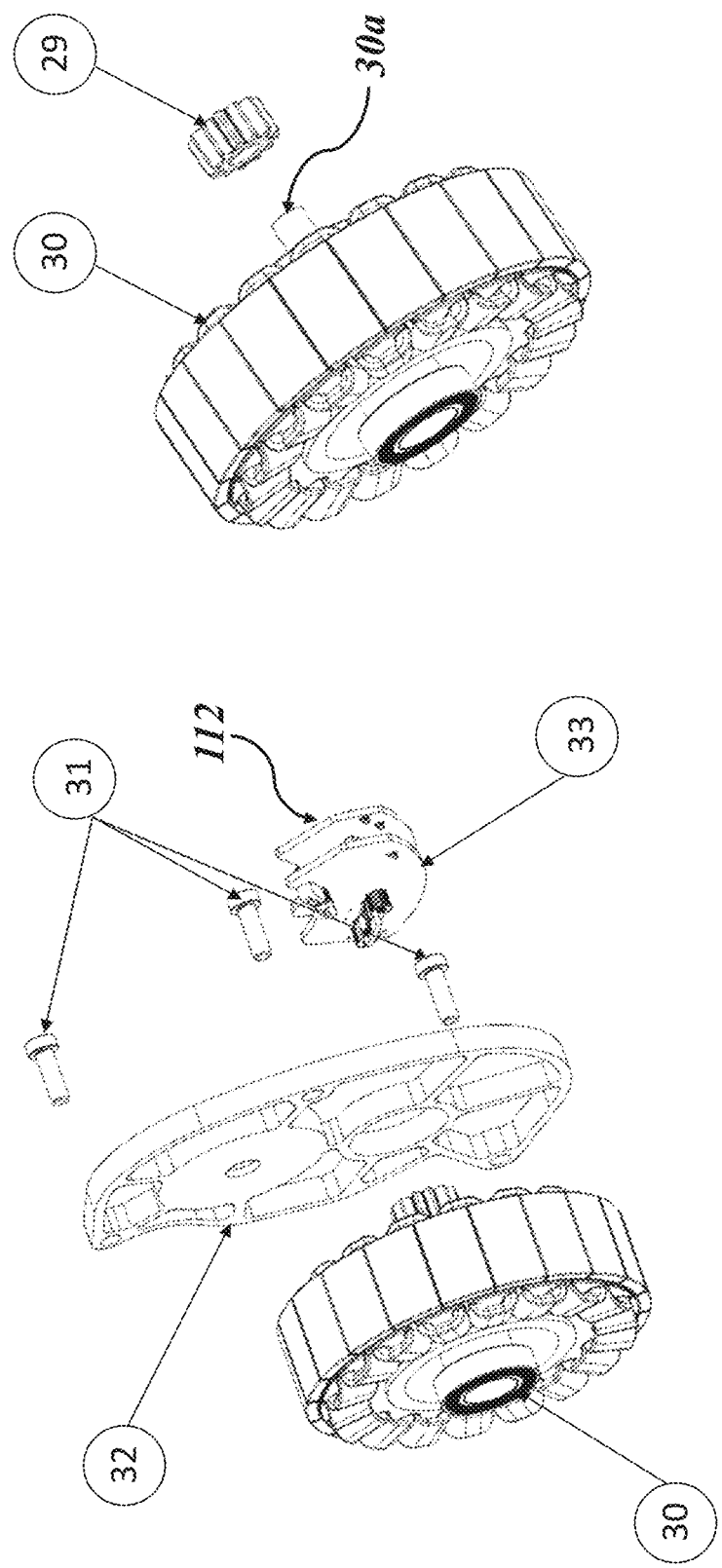

The electric motor 30 is mounted on a supporting plate 32 that is connected to the rest of the actuation system of the pedal-actuated electric vehicle by means of the screws 31 (see FIG. 6). A plate 33 that supports the integrated board 112 is mounted on the back of the support plate 32. The electric motor 30 has a gear wheel 29 mounted on the motor shaft 30a.

Figure 7:
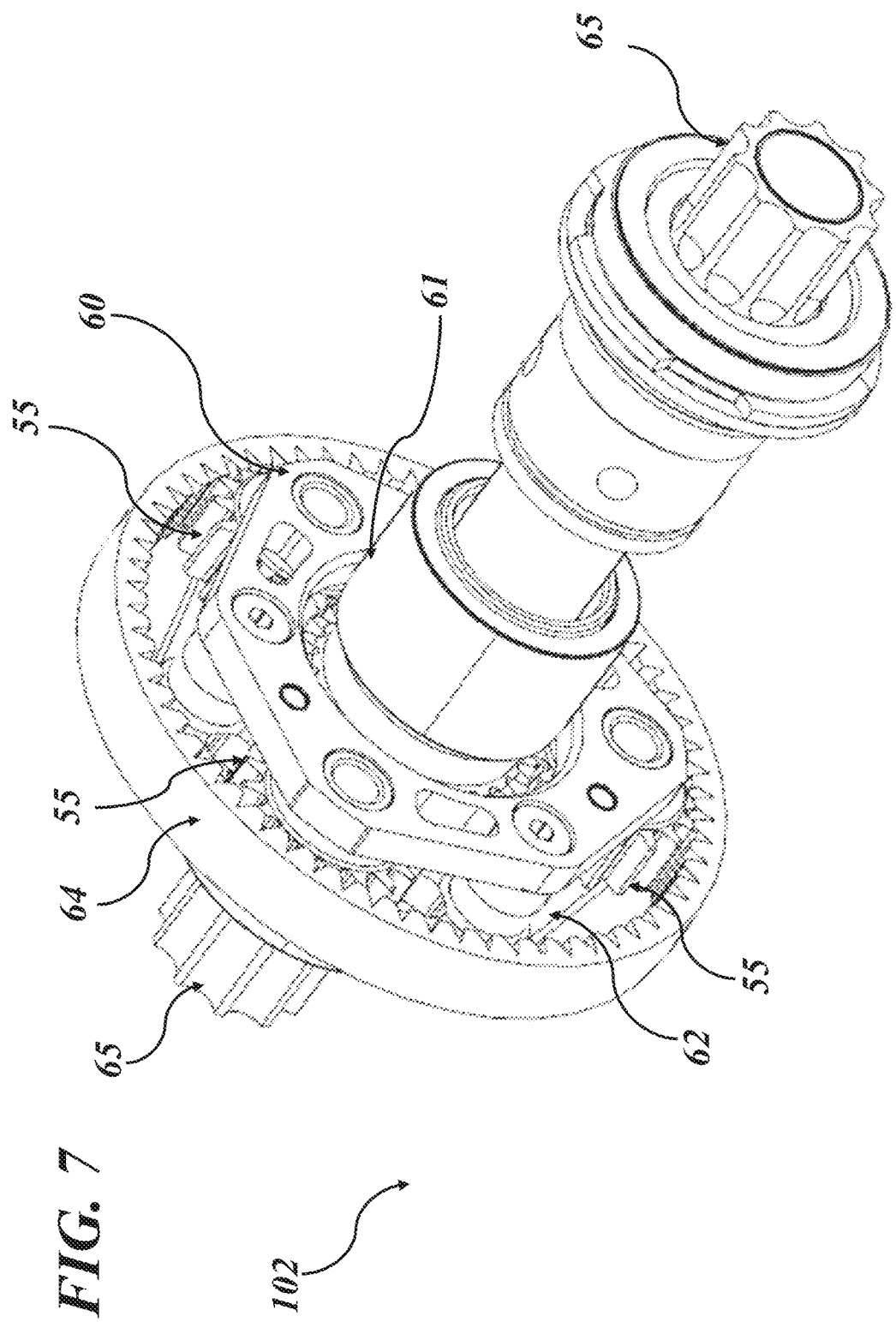

A reducer or epicyclic multiplier 102 will now be described with reference to FIGS. 7 and 8.

Once defined the values of the load from the pedals with an appropriate safety coefficient, the characteristics of the epicyclic mechanism made of steel and its design have been calculated.

In particular, the actuation and traction system includes a primary transmission comprising the epicyclic mechanism 102 and a final transmission that comprises a pinion 35.

Figure 8:
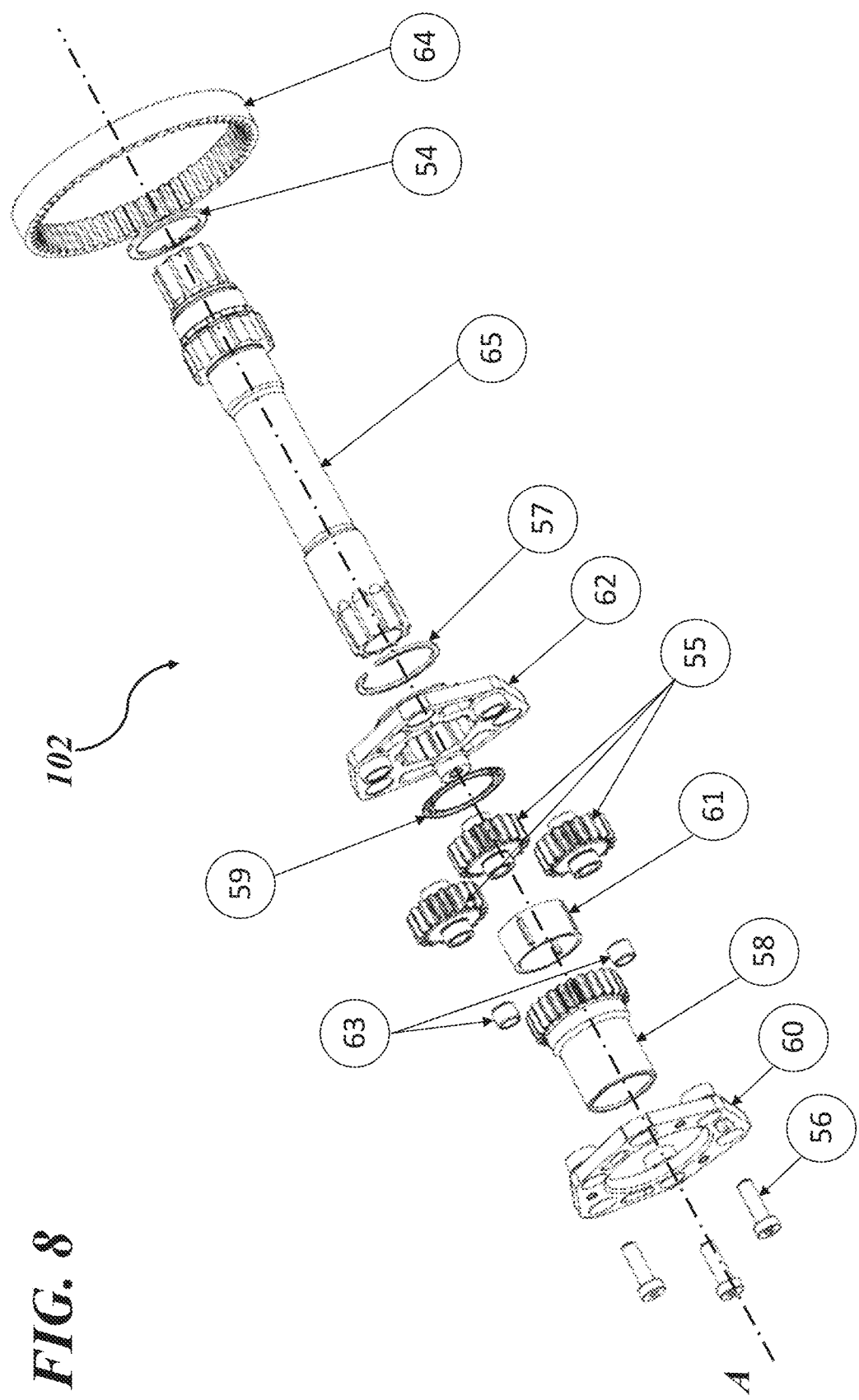

In FIG. 8, reference numeral 65 indicates a shaft positioned on pedal axis A. Several elements that form the epicyclic mechanism 102 are mounted on the shaft 65 coaxial to the pedal axis A.

In particular, there is a right planetary flange 60 and a left planetary flange 62 that together form a satellite carrier. A left sun gear 58, a roller bearing 61, and three externally toothed satellite gears 55 are interposed between the two planetary flanges 60 and 62. A pedal axis slewing ring 59 is arranged between the left planetary flange 62 and the left sun gear 58. There are also a number of centering bushings 63, adapted to cooperate with pre-drilled holes on planetary flanges 60 and 62 and to be fixed by means of screws 56.

There are also some stop rings indicated by reference numerals 54 and 57. Finally, there is a fixed internally toothed crown gear 64. The fixed crown gear 64 provides a toothed inner profile capable of cooperating with the toothed outer profiles of the satellite gears 55.

The fixed crown gear 64, meshing with the satellite gears 55, allows the gear ratio to be defined.

The epicyclic reducer 102 is a mechanical member that can alternate the speed ratios between the input and output shafts. The sun gear 58, as an input to the motion, rotates three satellite gears 55 that rotate within the toothed ring gear 64. As a result, the axes of the satellite gears themselves 55, mounted on the satellite holder 60, 62, move along a circumference. The satellite carrier 60, 62 thus rotates at a reduced speed relative to the sun gear 58.

The actuator and expandable pulley mechanism will now be described with reference to FIG. 9. In particular, there are two expandable pulleys, primary 110 and secondary 108, in which the primary pulley 110 is the driven pulley connected to the pedals or motor, and the secondary pulley 108 is the passive pulley.

The two expandable pulleys, primary 110 and secondary 108, in turn, comprise two elements, one fixed and one movable that work together to define the expandable pulleys.

The actuator 106 comprises an actuator body 24, connected by means of a main body 106c and by means of a fork 106b to a movable-side primary pulley 18.

The main body 106c comprises a through-hole 106d adapted for accommodating a portion of said movable-side primary pulley 18.

At the opposite end of the main body 106c from the fork 106b, there is a lever element 106a hinged on the pin constrained to the box c that acts as the pivot pin of the lever on the box.

The primary pulley 110 comprises a movable-side primary pulley 18 that cooperates with a fixed-side primary pulley 20. In this manner, the primary driven pulley 110 is an expandable pulley. A toothed belt 19 is indicated by reference numeral 19 that is used to transfer movement from the driven primary pulley 110 to the passive secondary pulley 108. Symmetrically, the secondary pulley 108 comprises a movable-side secondary pulley 16 that cooperates with a fixed-side secondary pulley 17.

Reference numeral 21 indicates a primary pulley spring, reference numeral 22 is an elastic stop ring or circlip, and reference numeral 23 is a spring casing.

Figure 9:
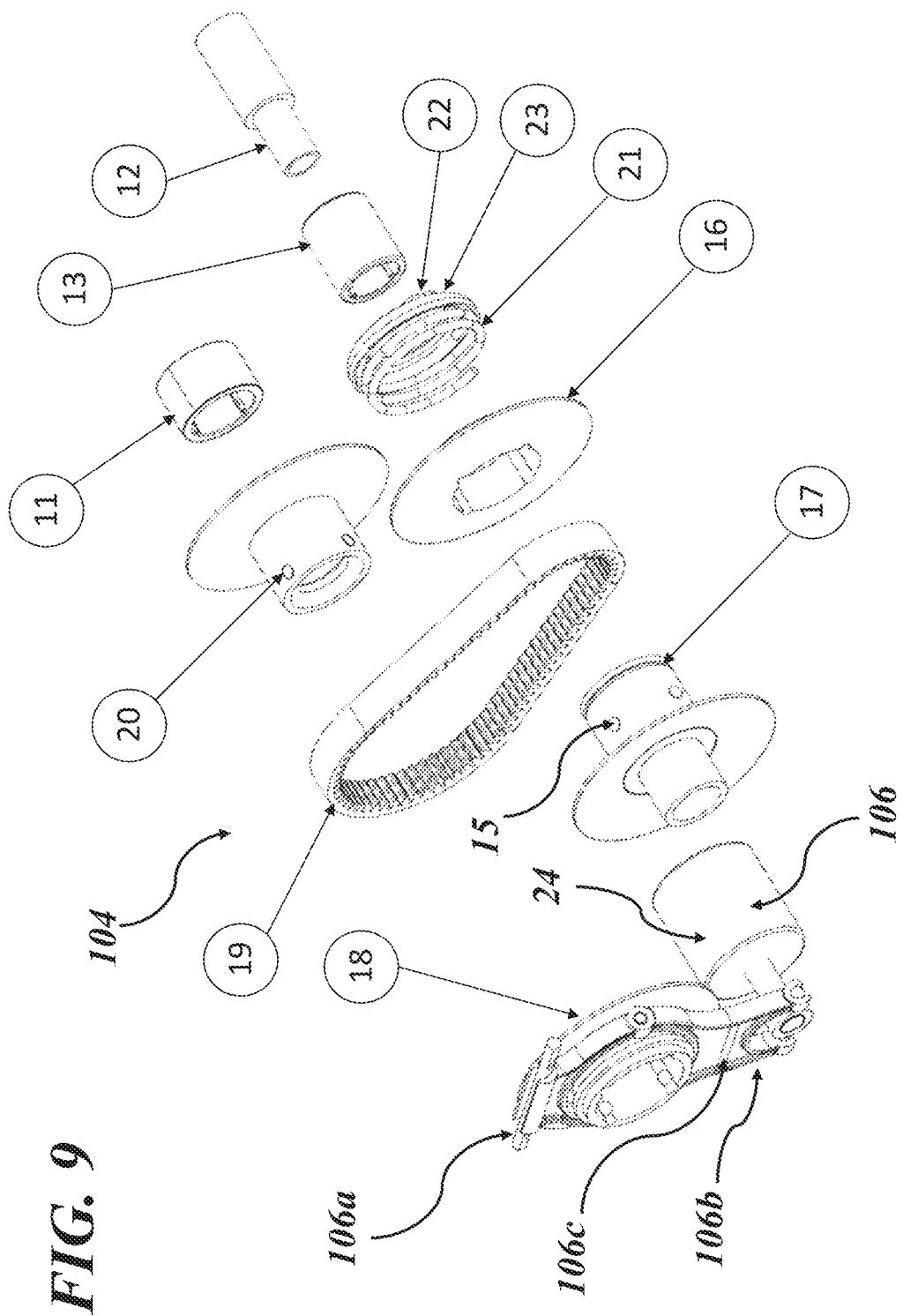

Again, with reference to FIG. 9, there is a free wheel 11, a supporting element 12 of the secondary driven pulley 108, and a roller bearing 13.

Reference numeral 15 shows balls present on the primary pulleys 17 and 20. These balls 15 are adapted to cooperate with corresponding grooves 16a and 18a made in the inner portion of the movable-side secondary pulley on the 16 and the inner portion of the movable-side primary pulley 18, respectively.

Reference numeral 106b indicates the actuator fork that comprises pins, and the fork actuation system is integrated with the linear motor.

Figure 10:
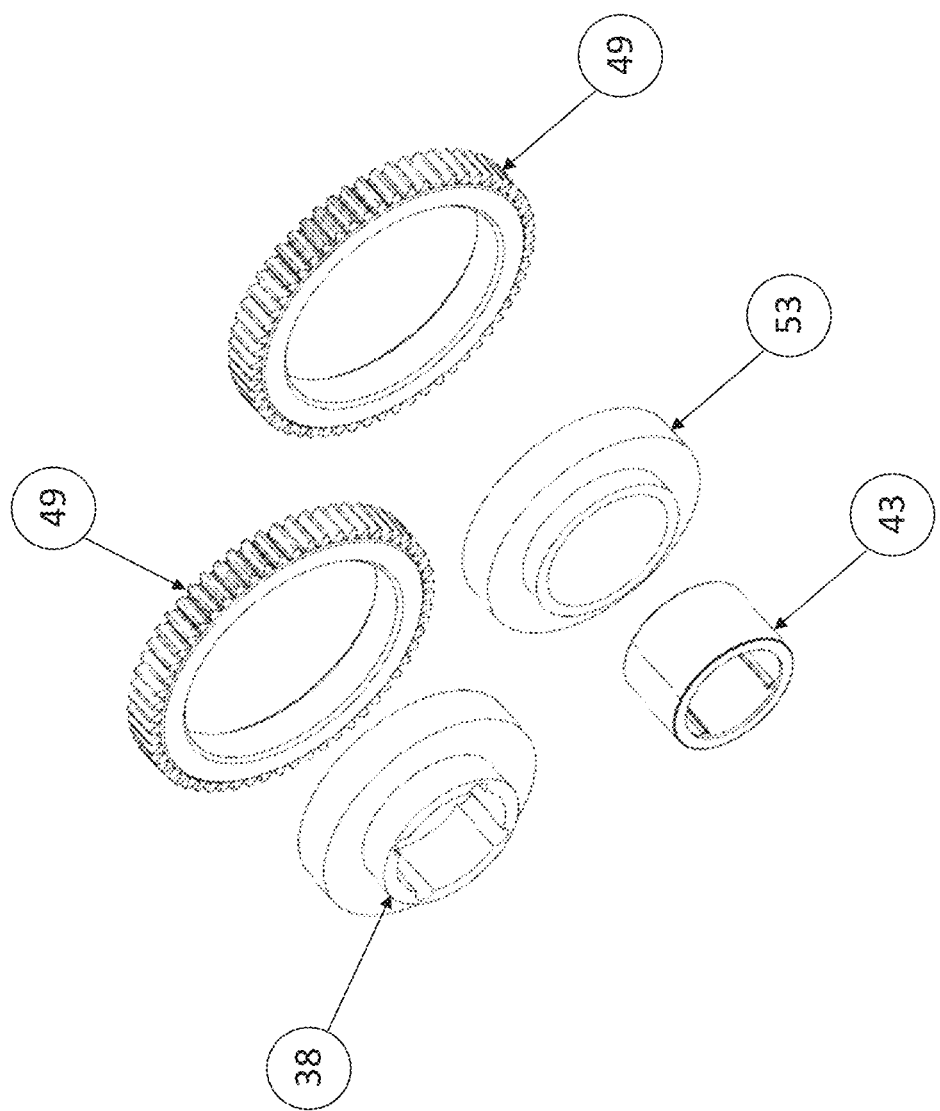

FIG. 10 shows the two externally toothed wheels 49 that implement the transmission of motion from the pedal axis A to the wheels. Reference numeral 38 indicates a wheel support on the pedal axis A and reference 53 indicates a secondary pulley wheel support adapted to accommodate a decoupling device, e.g., a free wheel 43, inside it. The free wheel 43 keeps the pedals from always moving even when traction energy is not required (such as when braking or downhill or during a speed deceleration). In particular, the presence of the decoupling device allows the bicycle to be in motion with the wheels rotating and the pedals stationary.

Figure 11:
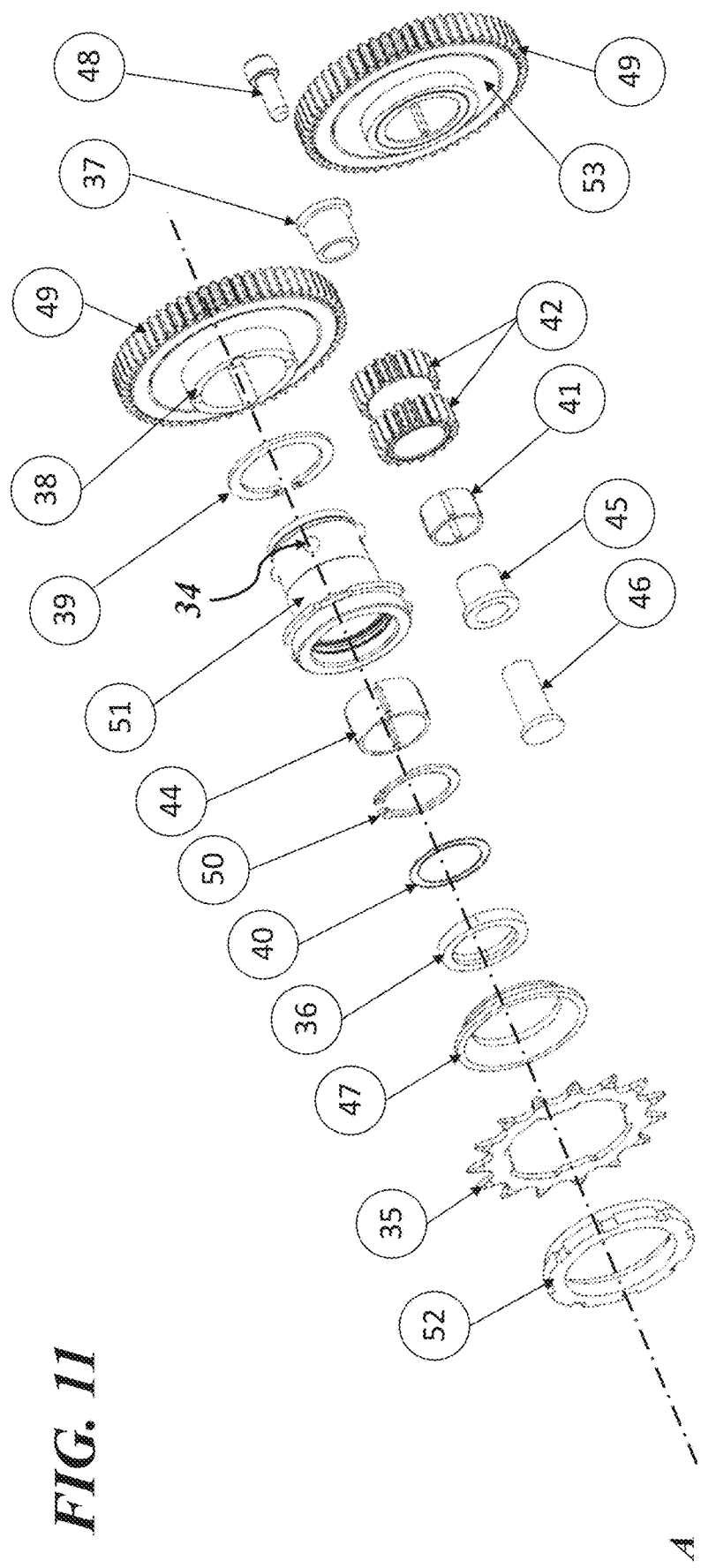

With reference to FIG. 11, elements that form the final transmission will now be described. The final transmission comprises a cascade of gears and allows the transfer of motion from the pedals or motor to the wheels of the bicycle.

Reference numeral 52 indicates a lock ring (e.g., a Bosch lock ring) on which the grooved pinion 35 is mounted. The pinion 35 engages a chain that actuates the bicycle wheel. The pedals, chain, wheel, and bike frame are not illustrated for ease of illustration in the drawings.

A pinion spacer 47 is present on the opposite side of the pinion 35 with respect to the ring nut 52. The pinion spacer 47 is connected to a Corteco seal ring 36 that is connected to a washer 40 held in place by a stop ring 50. Reference numeral 44 indicates a roller bearing received in a pinion carrier 51. Reference numeral 34 indicates some primary pulley balls arranged on the pinion carrier 51. There is also an elastic stop ring or circlip 39 positioned between the pinion carrier 51 and the wheel support on the pedal axis 38.

The transmission provides two intermediate wheels 42 externally toothed and mounted on a roller bearing 41. The intermediate toothed wheels 42 are intended to interact with the two wheels 49.

The elements 37 and 45 indicate supports for the intermediate gears 42. The elements 41, 42, 45, and 37 are held together by means of a screw 48 and an outer pin 46.

As seen above, with a variable speed drive with an actuator operated autonomously with respect to pedaling, it is also possible to meet the demand to have automatic positioning on the most convenient gear ratio for starting.

A belt-actuated variable speed drive has thus been designed, which, instead of having the usual centrifugally actuated actuator, is provided with a motorized actuation by means of an electric motor. The sizing of the variable speed drive ratio variation is based on the evaluation of the variation obtained with the discrete gears summarized in the following table indicative of a possible solution:

| RPM | WHEEL ROLLING (m) | Variable RATIO | | | epicyclic reducer | RPM | | Pinion final reduction | Wheel final reduction | SPEED (km/h) | GEAR RATIO | Motor reduction | Motor RPM |
|---|---|---|---|---|---|---|---|---|---|---|---|---|---|
| | | PRIMARY | SECOND-ARY | RATIO | | Drive pulley | Driven pulley | | | | | | |
| 60 | 2.2 | | | | 62 | | | 65 | 15 | 8 | first | 65 | 646 |
| | | 44 | 77 | 1.75 | 25 | 209 | 119 | 65 | 30 | 24 | second | 12 | 1979 |
| | | 77 | 44 | 0.57 | 3.48 | 209 | 365 | 1.00 | 0.50 | | | 5.42 | |

Furthermore, the following table (in FIG. 17) shows the different ratios that can be obtained with the three pinions of 22, 32, and 44 and the nine pinions of 11, 12, 14, 16, 18, 21, 24, 28, and 32. Normally the crowns are in front on the pedal axis and the pinions behind on the rear wheel axis.

The correct positioning of the driven pulley 110 and passive pulley 108 to achieve the desired gear ratio 108 is achieved with an electric motor 30 which is reversibly actuation and controllable for number of revolutions so that the correct positioning is always achieved. The motor 30 was chosen from existing commercial products with special attention to the characteristics of weight, size, and reliability, the latter also achieved through underutilization of the potential of the electric motor 30 both in terms of use time and required performance.

A commercial product chosen on the basis of adequate sizing as well as oil and heat resistance and the presence of indispensable antistatic characteristics, was used for the drive belt 19.

Figure 12:
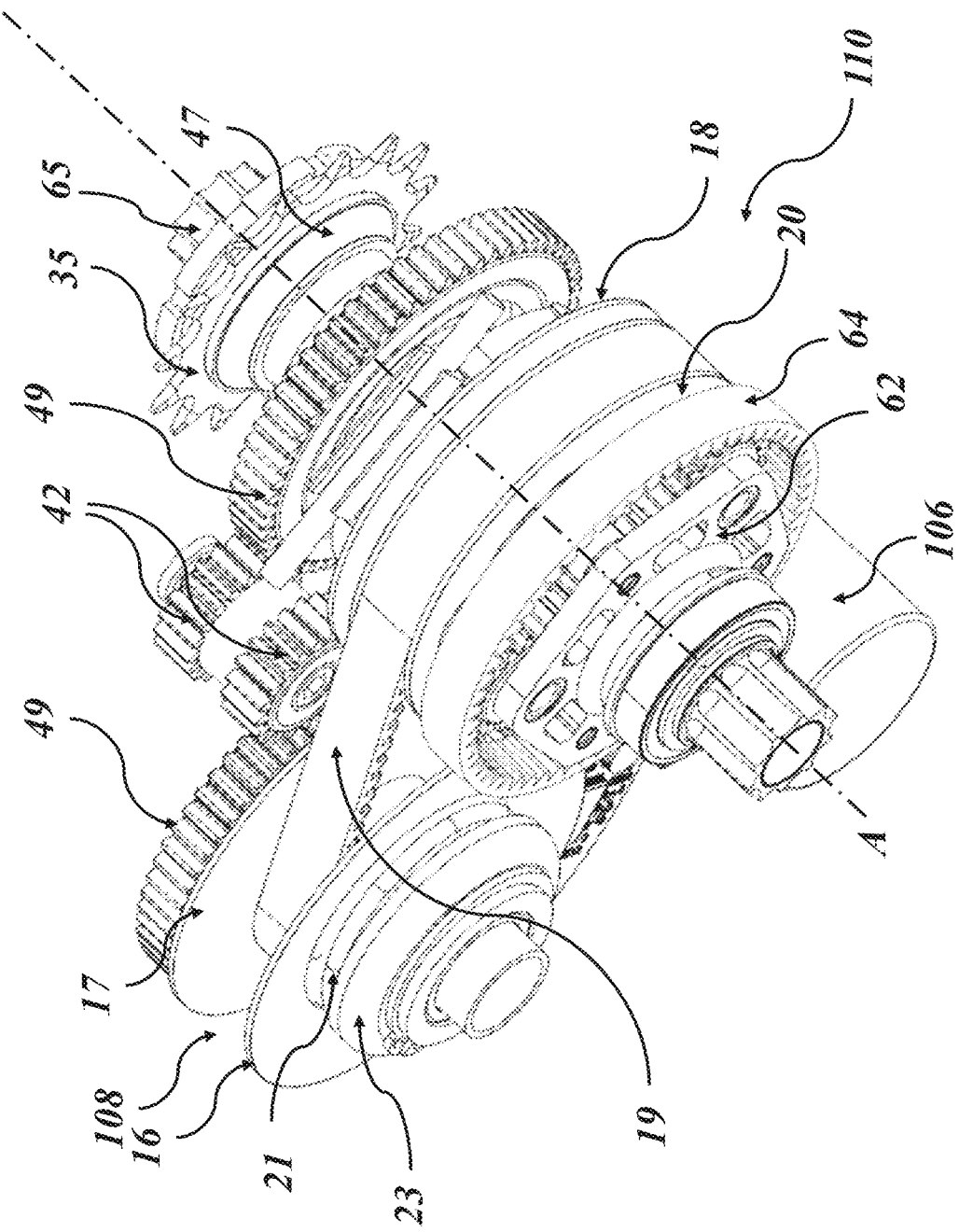
FIG. 12 shows the traction and actuation system according to the present invention in the assembled condition but without the protective casing.

FIG. 12 shows the traction and actuation system according to the present invention in the assembled condition but without the protective casing.

In a preferred embodiment, the electric traction motor 30 (see FIG. 13) of the permanent magnet type is made available from a specialized supplier which provides optimal performance between 1500 and 4000 rpm and a torque of 120 N/m.

FIG. 13A shows the condition in which the driven primary pulley 110 is in the maximum opening condition, while the passive secondary pulley 108 is in the minimum opening condition. When the driven primary pulley 110 is in the maximum open condition the movable-side primary pulley 18 is at its maximum distance from the fixed-side primary pulley 20. Similarly, when the passive secondary pulley 108 is in the minimum open condition, the movable-side secondary pulley 16 is at its minimum distance from the fixed-side secondary pulley 17. In this condition, the belt 19 is at its lowest position in primary pulley 110 and at its highest position in secondary pulley 108.

Figure 13:
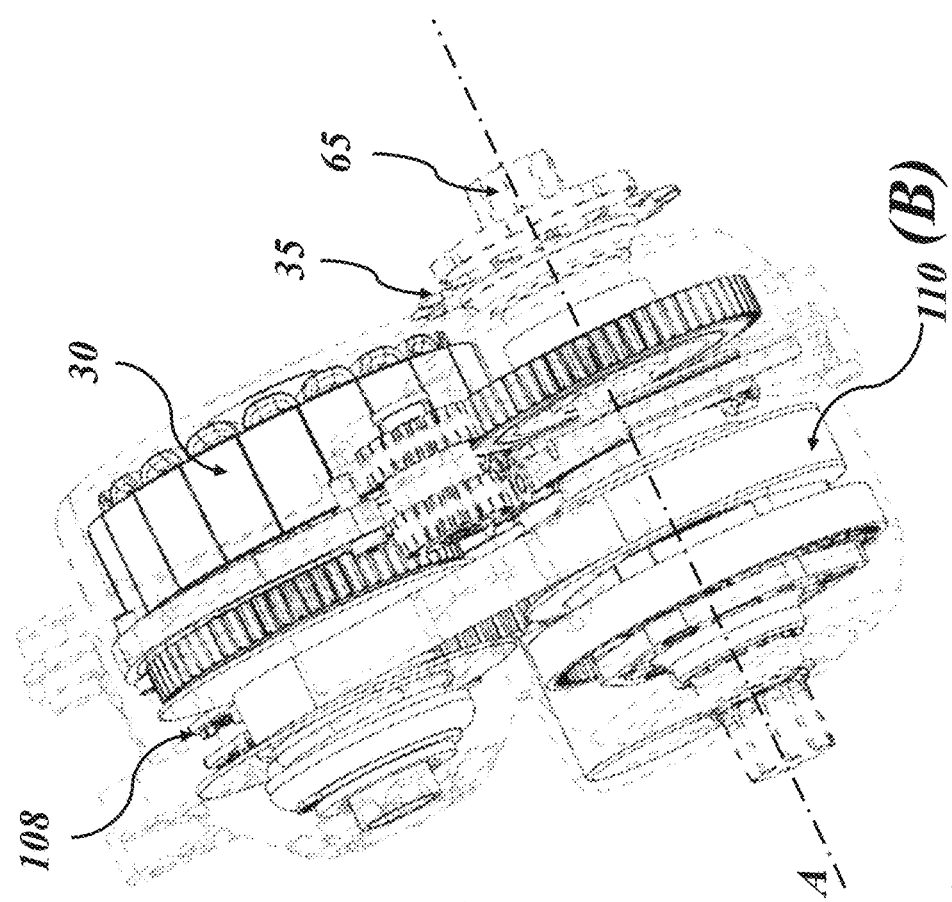
FIG. 13 shows a top view of the traction and actuation system according to the present invention in the assembled condition with particular emphasis on the expandable pulley mechanism.
Figure 13:
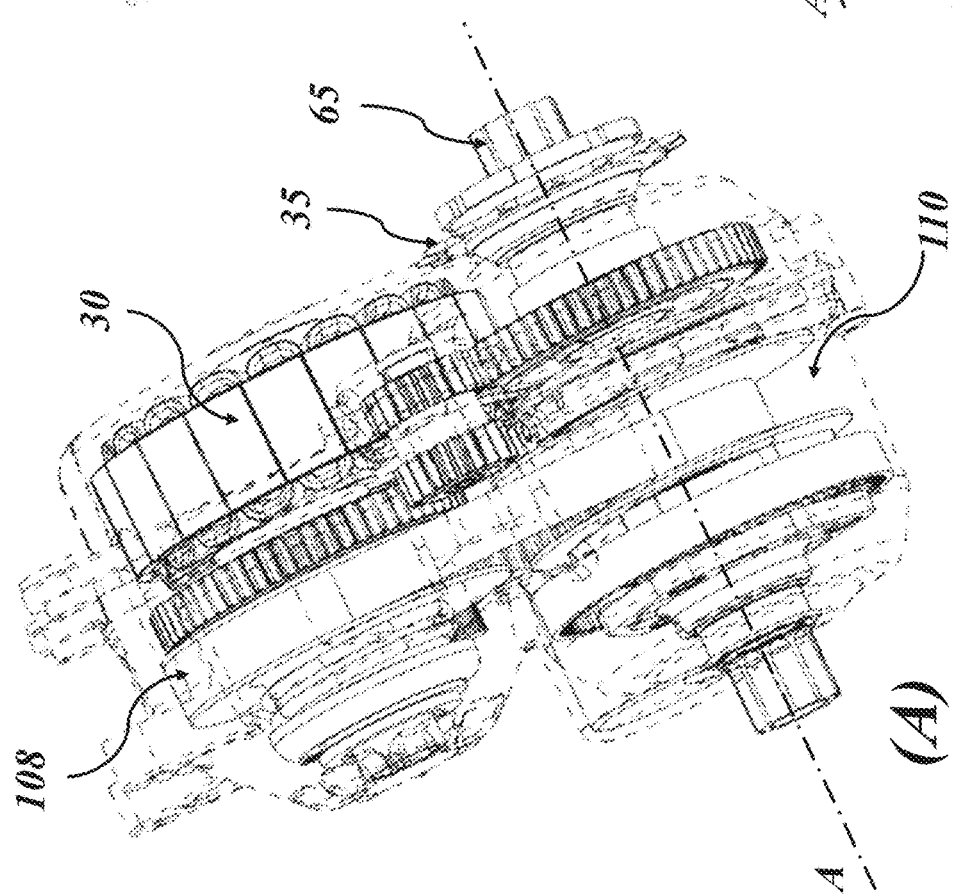

FIG. 13 B, on the other hand, shows the condition in which primary pulley 110 is in the minimum opening condition, while secondary pulley 108 is in the maximum opening condition. When primary pulley 110 is in the minimum open condition, the movable-side primary pulley 18 is at its minimum distance from the fixed-side primary pulley 20. Similarly, when the secondary pulley 108 is in the maximum open condition, the movable-side secondary pulley 16 is at its maximum distance from the fixed-side secondary pulley 17. The belt 19 in this condition is at its highest position in primary pulley 110 and at its lowest position in secondary pulley 108.

Figure 14:
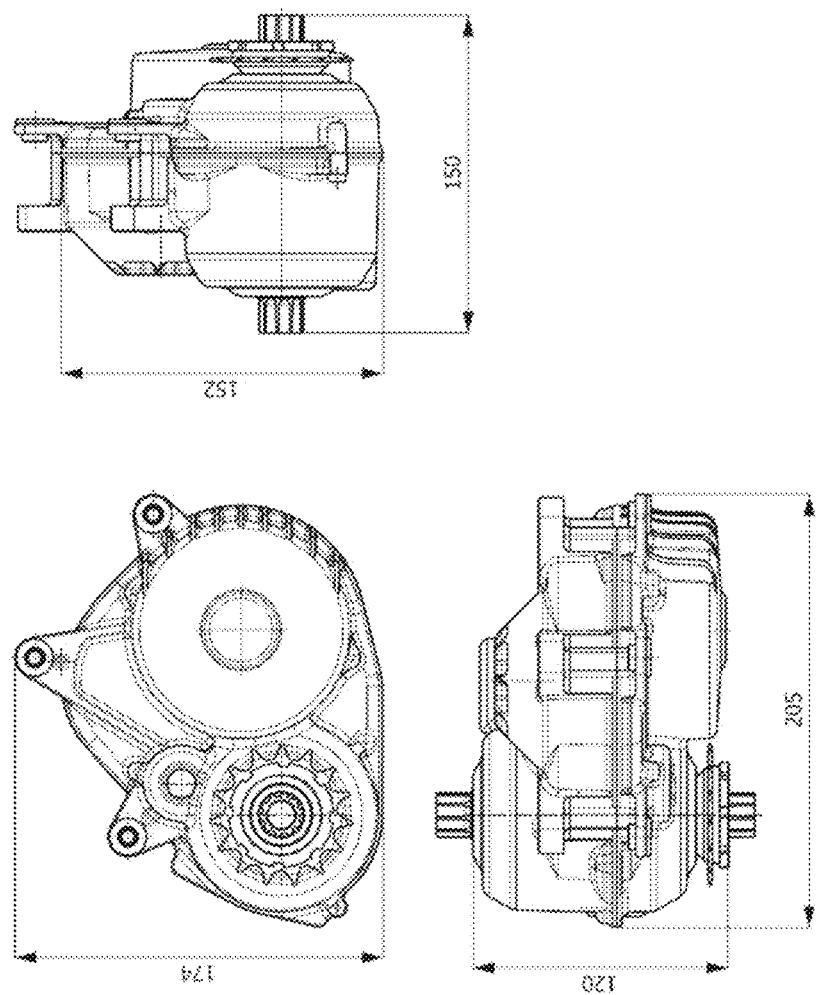
FIG. 14 shows diagrammatic side, front, and top views of the traction and actuation system according to the present invention with overall dimensions shown.

FIG. 14 shows the maximum overall dimensions of the actuation and traction system. In particular, the maximum dimension is 174 cm in height, the maximum dimension is 150 cm in width, and the maximum dimension is 205 cm in length. These dimensions are indicated as non-limiting examples and were identified with consideration of the various structural constraints and general indications for a proper setting of position and pedaling.

Figure 15:
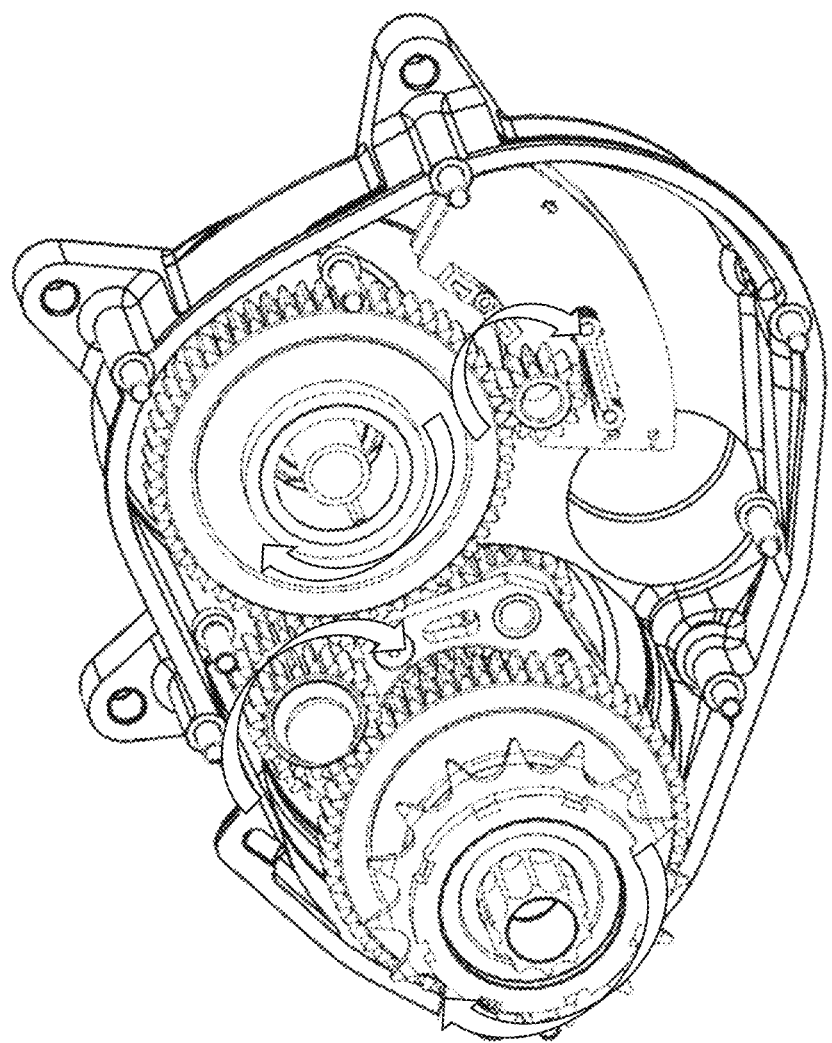
FIG. 15 shows a perspective view of the traction and actuation system according to the present invention in the assembled condition with particular emphasis on the transmission of motion with the motor in action.
Figure 16:
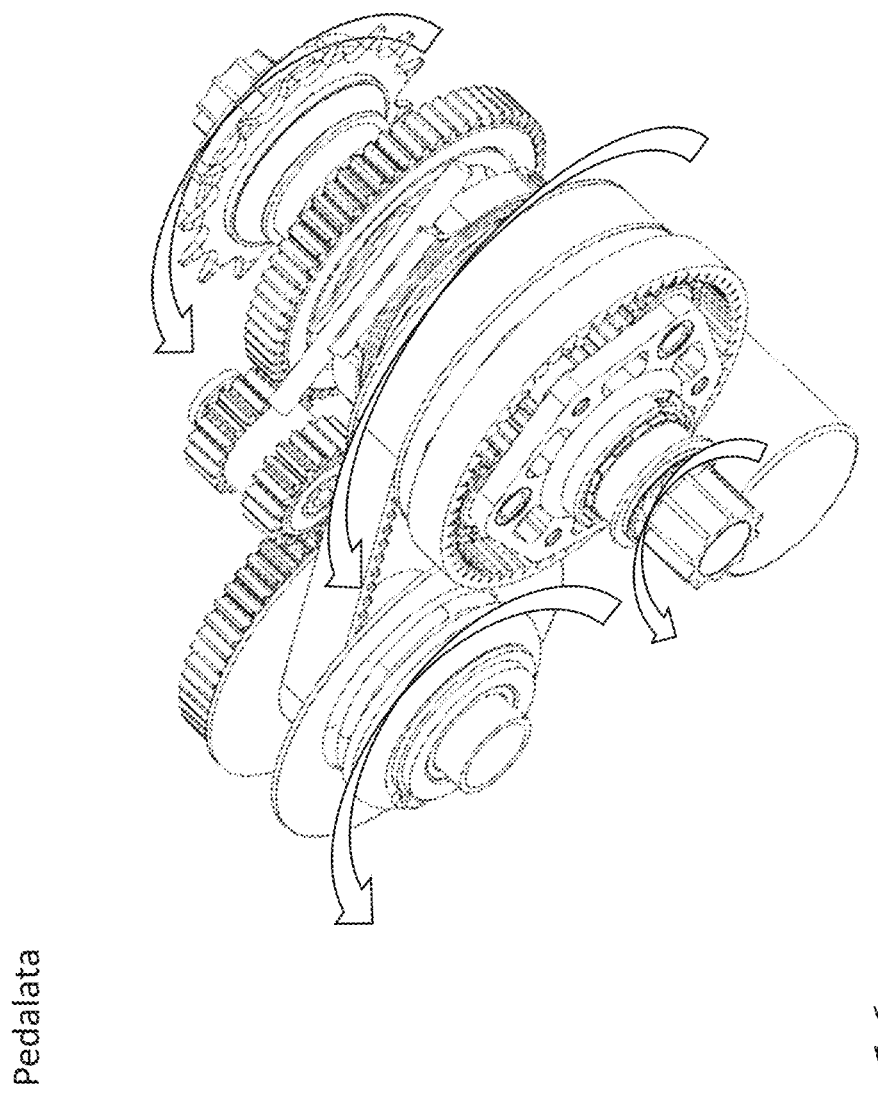
FIG. 16 shows a top, perspective view of the traction and actuation system according to the present invention in the assembled condition with particular emphasis on the transmission of motion while pedaling.

With reference to FIG. 15 and FIG. 16, the actuation and traction system in the operating condition is shown. The arrows show the direction of rotation of the various elements of the actuation and traction system.

The connection of the electric motor 30 to the pinion 35 is made through a cascade of gears adapted to obtain the desired gear ratio between the motor 30 that rotates at high speed, and the pinion 35 that actuates the transmission chain of the pedal-actuated electric vehicle.

While pedaling, the epicyclic multiplier 102 actuates the driven primary pulley 110, coaxial to the pedal axis A, with which the belt 19 is driven. This belt 19 transmits motion to the passive secondary pulley 108 that acts on the final drive (pinion 35 which meshes with the drive chain at the wheel) by means of a cascade of gears; the gear connected to the secondary pulley 108 also meshes with a gear on which the electric motor 30 is keyed, which assists pedaling according to the required torque. The motor 30 is always active in the step of pushing on the pedals.

During active pedaling, the pedal axis A is connected to the epicyclic multiplier because it actuates the satellite carrier 60/62, which, by means of the satellite gears 55 that engage in the crown gear 64 housed in the casing, actuates the sun gear 58. The sun gear 58 transmits active rotation to the primary pulley 110 by means of the free wheel 11.

The primary pulley 110 by means of the belt 19 drives the secondary pulley 108 that is connected to the gear 49 by means of a free wheel 43. The free wheel 43 locks the gear 49 with the secondary pulley 108 (16/17) when the motion comes from the pulley.

The gear 49 is connected by means of the gear 29 to the motor 30 and by means of the gear 42 to the counterpart gear 49 that in turn is connected to the pinion 35.

Therefore, in case of active pedaling, the effort is transmitted from pedal axis A to pinion 35 by means of the transmissions of satellite gears 55>sun gear 58>primary pulley 110>secondary pulley 108>gear 49>gear 42>gear 49>pinion 35.

The operation of the motor 30 connected to the gear 49 to support pedaling depends on the management SW and the setting chosen by the user.

During the step of coasting, when the pedals are stationary when the motion comes from the wheel, the pinion 35 drives by effect of rigid linkage the gears 49>42>49>29 (motor) with more or less regeneration function according to the setting. By virtue of the presence of a decoupling device, i.e., the free wheel 43, the secondary pulley is not fed and thus remains stationary as well as the primary pulley, sun gear, satellite gears, and pedal axis.

In case of reverse pedaling (when the pedals have to be operated backward for whatever reason), the entire pulley assembly would be set in motion if the pedal axis were rigidly connected to the primary pulley. The presence of the free wheel 11 between the pedal axis and the primary pulley 110 eliminates coasting in this direction of rotation as well.

During operation, no matter how high the efficiency of the motor 30 is, heat is produced by both the motor 30 itself and the electronic board 112. For dissipating it, given the high thermal conductivity characteristics of the container casing, the latter was provided with a series of fins 1b, which increase heat dissipation. The electronic board 112 is placed in contact with the surface of the container by means of a high conductivity mat (not shown).

The kinetic energy recovery system in braking, which is done by means of the rotation of the motor obtained from the cascade of gears connected to the pinion, can recover the energy from the speed of the bike and transform it into electrical energy. This energy recharges the battery and is thus usable again for pedal assistance.

The sensors integrated into the system are:
the speed sensor is applied directly to the electronic board 112 and takes the signal from the gear rotating nearby, and torque sensor applied near the pedal axis takes the signal through the sun gear of the epicyclic gear controlled by the pedal axis itself.

The electronic board 112 which contains the management SW is arranged in contact with the outer wall of the casing 1 to facilitate its cooling promoted by the application of a heat-conducting mat. The development of the device management SW is the subject of a different project.

Of course, the solution can also be applied to electric tricycles or quadricycles.

Although the present invention is explained above by means of a detailed description of the embodiments thereof shown in the drawings the present invention is obviously not limited to the embodiments described above and shown on the drawings; on the contrary, all the variants and/or changes to the embodiments described and shown on the accompanying drawings are comprised in the object of the present invention and will be apparent and immediate to a person skilled in the art.

The scope of protection of the present invention is thus defined by the claims.

The invention claimed is:

1. An actuation and traction system for a pedal-actuated electric vehicle comprising an electric motor, a transmission comprising an epicyclic device, a continuous variable speed drive actuated independently of the pedals, wherein said continuous variable speed drive comprises an actuator that positions the ratio, and two expandable pulleys, an integrated board provided with devices for actuating control software with sensor management, wherein said integrated board is adapted to control said electric motor based on the signals received from sensors, a pinion for transmitting the motion from the pedals or electric motor to the wheel of the electric vehicle, wherein said pinion and said continuous variable speed drive are positioned coaxially on the pedal axis, wherein the motion transmission between the pedals and the wheel of the electric vehicle occurs through a kinematic chain which comprises said epicyclic device and said variable speed drive, and wherein the transmission of the motion between the electric motor and the pinion occurs through a cascade of gears adapted to obtain the desired transformation ratio between the electric motor that rotates at high speed, and the pinion that actuates a drive chain between the pinion and the wheel for transmitting motion to the wheel of the electric vehicle, and wherein said epicyclic device is mounted on a shaft positioned on the pedal axis of the electric vehicle and comprises a satellite carrier formed by a right planetary flange and a left planetary flange, wherein said epicyclic device comprises, between the two flanges of said satellite carrier, a sun gear, a roller bearing, three externally toothed satellite gears, and an internally toothed fixed crown gear that provides an internally toothed profile capable of cooperating with the externally toothed profiles of the satellite gears, wherein said fixed crown gear meshing with said satellite gears allows the transmission ratio to be defined.

2. The actuation and traction system according to claim 1, wherein said continuous variable speed drive comprises the actuator and said pulleys comprise a driven primary pulley connected to the pedals or motor and a passive secondary pulley, wherein said pulleys are connected to each other by a toothed belt for transferring the movement from the driven primary pulley to the passive secondary pulley.

3. The actuation and traction system according to claim 2, wherein the primary pulley comprises a movable-side primary pulley that cooperates with a fixed-side primary pulley, and the secondary pulley comprises a movable-side secondary pulley that cooperates with a fixed-side secondary pulley.

4. The actuation and traction system according to claim 3, wherein said actuator comprises an actuator body, connected by means of a main body and by means of a fork to the movable-side primary pulley, wherein said main body provides a lever element that constitutes a lever pin, at the opposite end of the main body with respect to the fork.

5. The actuation and traction system according to claim 4, wherein said continuous variable speed drive comprises a free wheel, a supporting element of the secondary driven pulley, and a roller bearing.

6. The actuation and traction system according to claim 2, wherein the transmission of the motion from a pedal axle to the wheels of the electric vehicle occurs by means of two externally toothed wheels, the first mounted on a wheel support on the pedal axle and the second on a wheel support of the secondary pulley.

7. The actuation and traction system according to claim 6, wherein said second externally toothed wheel is adapted to accommodate a decoupling device therein, which device allows the pedals to be decoupled from the wheel of the electric vehicle.

8. The actuation and traction system according to claim 7, wherein said decoupling device is a free wheel for decoupling the pedals from the wheel to achieve energy recovery under braking.

9. The actuation and traction system according to claim 7, wherein the kinematic chain for transmitting the motion from the pedal axle to the wheels comprises a second decoupling device between the pedal axle and said primary pulley.

10. The actuation and traction system according to claim 9, comprising a casing for containing therein said electric motor, said transmission comprising the epicyclic device and the variable speed drive and wherein said pinion is positioned outside said casing, wherein said casing is comprises one or more elements configured to disperse heat.

11. The actuation and traction system according to claim 10, wherein said casing is formed by two housings which comprise a plurality of attachment points which make it possible to fix the casing comprising the two housings to the frame of the electric vehicle, wherein a stop ring and a ball bearing are present inside one of said housings, and symmetrically on another one of said housing is a stop ring and a ball bearing are present to support the pedal axis and allow the pedals to rotate during the muscular or electric motor actuation.

12. The actuation and traction system according to claim 11, wherein one of said housings comprises cooling fins to better dissipate the heat generated by the actuation system of the electric vehicle.

13. An electric bicycle comprising an actuation and traction system according to claim 1.

14. An electric tricycle or electric quadricycle comprising an actuation and traction system according to claim 1.

* * * * *